W. GARDINER.
AUTOMATIC CURRENT CONTROL AND BRAKE VALVE MECHANISM.
APPLICATION FILED FEB. 16, 1918.
1,360,918.
Patented Nov. 30, 1920.
3 SHEETS—SHEET 1.
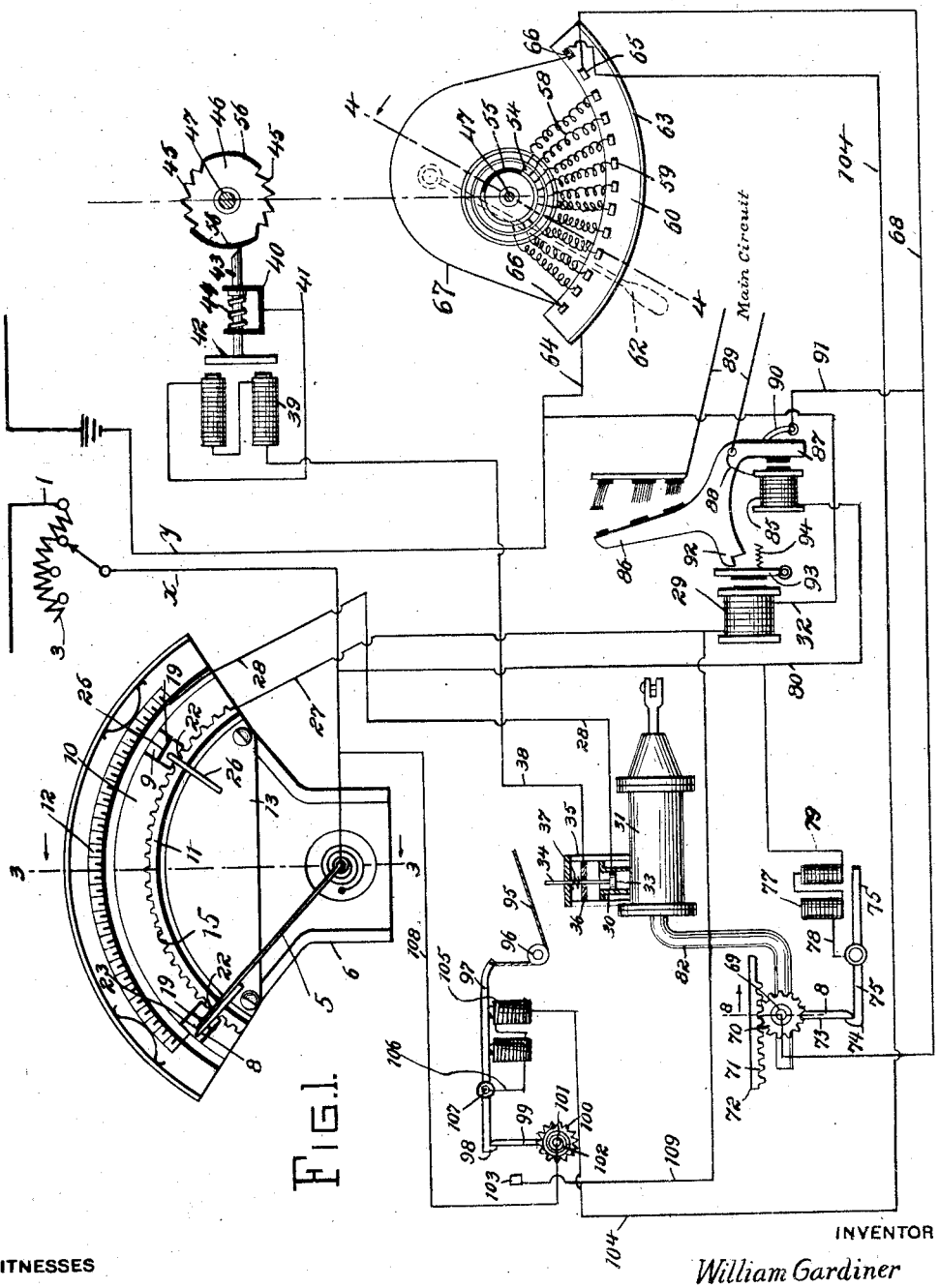
WITNESSES
INVENTOR
William Gardiner
BY
ATTORNEY

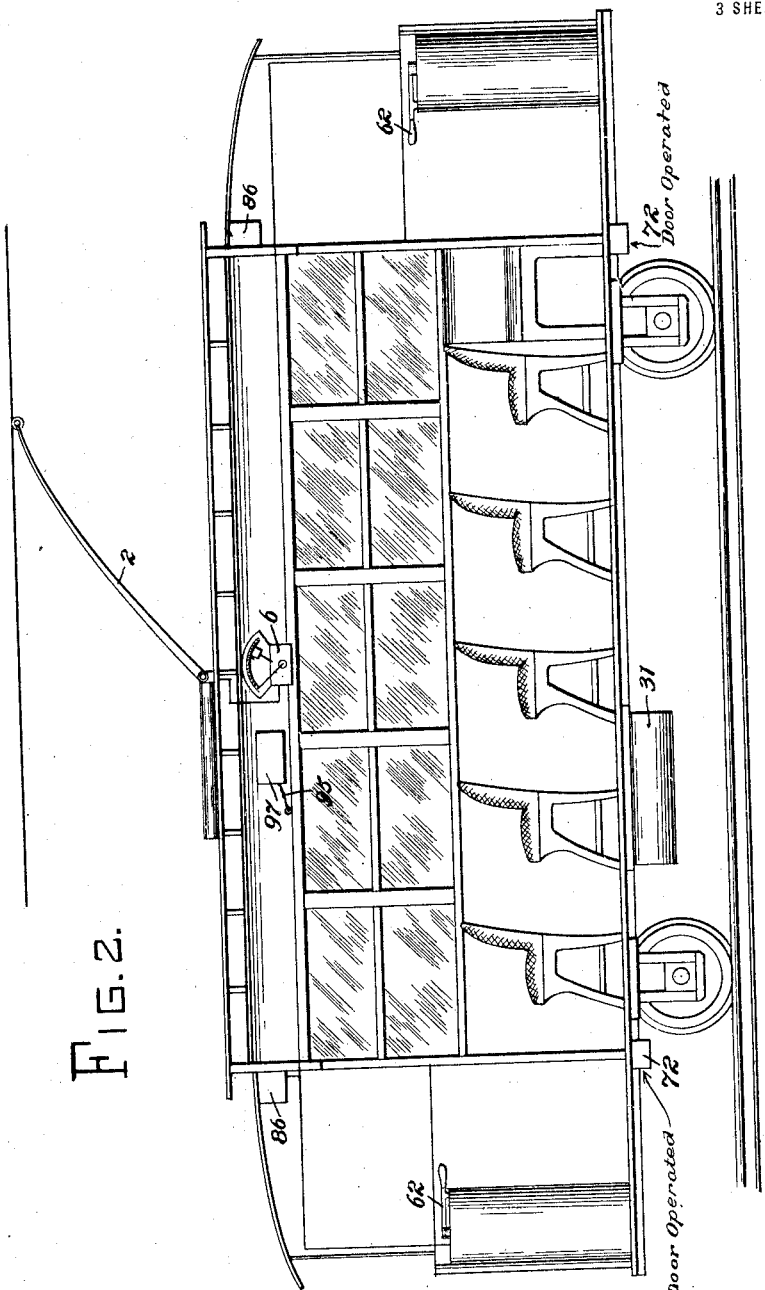

W. GARDINER.
AUTOMATIC CURRENT CONTROL AND BRAKE VALVE MECHANISM.
APPLICATION FILED FEB. 16, 1918.
1,360,918.
Patented Nov. 30, 1920.
3 SHEETS—SHEET 3.
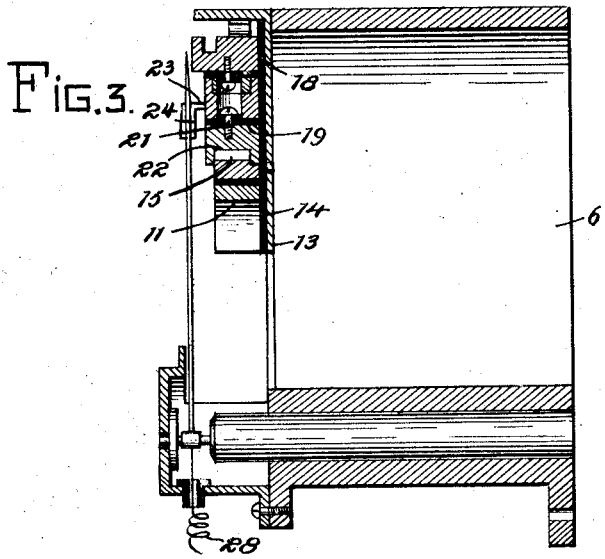
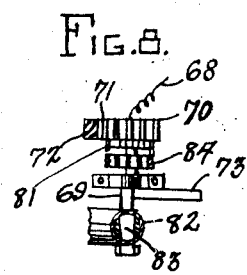
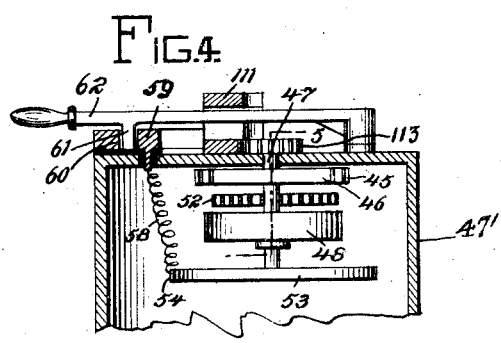
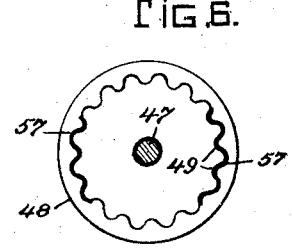
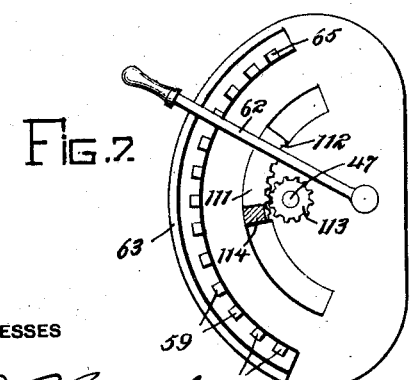
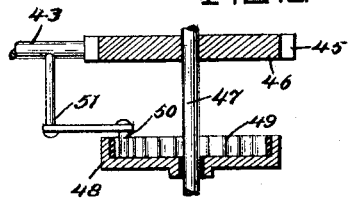
WITNESSES
J. F. Busch
Wm. S. Fowler.
INVENTOR
William Gardiner
BY Richard B. Owen.
ATTORNEY

UNITED STATES PATENT OFFICE.

WILLIAM GARDINER, OF CHICAGO, ILLINOIS.

AUTOMATIC CURRENT-CONTROL AND BRAKE-VALVE MECHANISM.

1,360,918.  Specification of Letters Patent.  Patented Nov. 30, 1920.

Application filed February 16, 1918. Serial No. 217,566.

*To all whom it may concern:*

Be it known that I, WILLIAM GARDINER, a citizen of the United States, residing at 409 N. State St., Chicago, in the county of Cook and State of Illinois, have invented certain new and useful Improvements in an Automatic Current-Control and Brake-Valve Mechanism, of which the following is a specification.

This invention relates to an electric street car system or automatic pick up and has for one object, the protection of the motors from too strong a current by automatically feeding the current as the car gains speed. The car will gain speed as quickly as the motor can stand more current. Another object of the invention is to cause an automatic application of the brakes and opening of the circuit breaker upon operation of the conductor's emergency valve, or by throwing controller handle to extreme or last point in either direction.

A further object of the invention resides in the provision of a system by which the power current will be automatically cut off upon releasing of the air brakes to make it impossible to start the car without first releasing the brakes on closed cars.

A further object resides in the provision of the system of the above stated character which will prevent starting of the car before the doors are closed.

With the above and other objects in view, as will appear as the description proceeds, the invention consists in the novel arrangement of coöperating elements as hereinafter more specifically set forth, pointed out in the claims and shown in the accompanying drawings.

In the drawings forming a part of this application, and in which similar reference characters designate corresponding parts throughout the several views, Figure 1, is a diagrammatic view of the complete invention, Fig. 2, is a longitudinal section through a car equipped with my invention to show the relative positions of the principal parts, Fig. 3, is a detail section through the ammeter, substantially on the plane of line 3—3 of Fig. 1, Fig. 4, is a detail section through a controller and parts connected therewith, substantially on the plane of line 4—4 of Fig. 1, Fig. 5, is a detail vertical section substantially on the plane of 5—5 of Fig. 4, Fig. 6, is a detail plan view of the internal gear wheel of the escapement of the current feeding mechanism for the controller, Fig. 7, is a detail plan view of the controller with the outer casing removed and the arcuate resetting member for the escapement or current feeding mechanism for the controller, shown in section, Fig. 8, is a detail vertical section on line 8—8 of Fig. 1, looking in the direction indicated by the arrow.

Referring more specifically to the drawings, 1 designates the current conducting wire carried by the trolley pole 2 and connected with the rheostat 3.

The wire leading from the rheostat will be referred to as X and the grounded wire as Y. The wire X leads to the needle 5 of the ammeter 6 which has the adjustable contact members 8 and 9. The stationary contact plate 11 is mounted upon the supporting plate 13 of the ammeter 6 and suitably insulated from the latter as shown at 14.

The plate 12, which will be hereafter referred to as the movable contact plate 12, is also insulated from the supporting plate 13, as shown at 18. Each of the adjustable contact members 8 and 9 are formed in inner and outer sections insulated from one another, as shown at 19, and are secured together by fastening members 21. The movable contact member 8 is provided with a contact pin 23 which is adapted for engagement with the needle 5 of the ammeter 6. A similar contact pin 25 is carried by the inner section of the movable contact member 9 and is adapted for engagement by the needle 5 when the latter moved to position against the same thereby completing a circuit from the needle 5 to the stationary contact plate 11.

The branches 27 and 28 of the X-wire lead respectively from the stationary contact plate 11 and the movable contact plate 12. The wire 27 connects with the magnet or solenoid 29 of the main circuit breaker of the system, while wire 28 connects with a guide 30 mounted on the side of the air brake cylinder 31 and in the form of an auxiliary cylinder around an opening in said side of the air brake cylinder 31. The wire 28 is thereby grounded on the cylinder 31.

The wire 32 leads from the magnet 29 and may be termed a branch of the Y-wire, said wire 32 leading to the main branch of the Y-wire which connects with the grounded wire as previously stated.

A piston 33 is mounted in the guide cylinder 30 and has a piston rod 34 working through guides 35 positioned around said guide cylinder 30. A contact member 36 is mounted upon and insulated from said piston rod 34 and also from guide members 35. The piston 33 is forced upwardly by the air pressure within the air brake cylinder 31, when the brakes are applied, but when the brakes are released and the pressure within the cylinder 31 is thereby reduced, a spring 37 surrounding the upper portion of the piston rod 34 will serve to force the same downwardly and cause reëngagement of the contact member 36 with the guide cylinder 30, thereby permitting the current to again pass through the branch wire 38 connected with the contact member 36 and by way of the branch wire 38, pass over to the electromagnet 39 and then to the bracket 40 by way of the branch wire 41.

The electro-magnet 39 when energized will attract the bar 42 on one end of the reciprocating escapement pawl 43, which has a spring 44 for resiliently retaining the bar 42 in spaced relation with the electro-magnet 39. The end of the escapement pawl 43 is beveled and adapted for engagement with the peripheral teeth 45 arranged in space series on the escapement wheel 46, which latter is mounted upon the rotary shaft 47. Beneath the wheel 46, a second wheel 48 is mounted upon the shaft 47 and has internal rounded teeth 49 for engagement by the downwardly directed offset lower extremity 50 of the depending branch arm 51 of the pawl 43. The teeth 49 are arranged in such a manner, however, that when the pawl 43 is engaged with one of the teeth 45 of the wheel 46, the lower extremity 50 of the branch arm 51 will be facing the rounded portion of one of the teeth 49 in the wheel 48 and when the pawl 43 is attracted by the electro-magnet 39, said lower extremity 50 of the branch arm 51 will move to position between two of the teeth 49 and thereby prevent the shaft 47 from rotating more than one notch or one tooth of the wheel 46, the object of which will presently be apparent.

It will be understood that a suitable spring 52 is provided for rotating the shaft 47 in the proper direction and the body of the wheel 48 is offset from or mounted upon the web provided for the same to prevent interference of the web with the branch arm 51 of the pawl 43. Beneath the wheel 48, the wheel or disk 53 is mounted upon the shaft 47 as part of the controller and serves to feed the current to the contact members 54 arranged in a series around the same, a portion of the periphery of the wheel or disk 53 being insulated, as shown at 55. 48 is insulated from 47. All of the periphery of wheel 46 is insulated except the shoulder of the notches which fit up against the pawl 43. There is no contact until the pawl 43 fits up squarely against the shoulder of the notches 45. The wires 58 lead from contact members 54 to contact members 59 in the usual manner, arranged around the runway or channel 60 for the contact or depending portion 61 of the controller handle 62, which portion 61 engages the spaced contact points 59, which will hereafter be termed "the points 59" of the controller, and the contact bar 63, which has electrical connection with the Y-wire, by means of the branch wire 64. Contact members 54 must be directly under the notches in the periphery of wheel 46, which correspond in space to one notch on a controller, said contact members 54 are held closely to the periphery of the disk 53 by suitable springs. Two extra points are provided at one end of the series of contact points 59 and one at the other end and one of these extra points will be hereafter termed the first off-point 65. The other extra points will be termed the emergency valve operating and brake applying points 66. One of the said mentioned points is located on either end of the series of points and a wire 67 forms electrical connections between the same. A branch 68 of the X-wire leads from one of the emergency valve operating and brake applying points 65 to a rotary shaft 69 which also serves as the valve stem of the air brake cylinder cock. This part of the invention will now be described in detail.

A pinion 70 is loosely mounted upon the shaft 69 and adapted for engagement at times by the rack teeth 71 on the reciprocating bar 72 which is connected to a door of the car, and which door (not shown) may be either a sliding door or a swinging door. An arm 73 projects radially from the shaft 69 and has a beveled end adapted to catch behind the latch member 74, formed on one end of the pivoted bar 75, the opposite or free end 76 of which is adapted to serve as an armature to be attracted by the magnet 77 when the latter is energized. A wire 78 connects the pivot of the bar 75 with the magnet 77 and the branch 79 of the X-wire connects the magnet 77 with another branch 80 of the X-wire, one end of the branch 80 being in turn connected with the main branch of the X-wire. Ratchet mechanism 81 is provided to automatically lock the pinion 70 with the shaft 69 when rotated in one direction, but leaving the pinion free to rotate upon the shaft 69 in the opposite direction. The purpose of this will presently be apparent. The shaft 69 extends through a branch pipe 82 projecting from the air brake cylinder 31 and valve 83 is formed upon the shaft 69 within the pipe 82 to serve as a drain valve or drain cock. A spring 84 is provided for rotating the shaft 69 in one direction when the arm 73 is released from the catch 74, thereby closing the valve or drain cock 83.

The remaining end of the branch wire 80 connects with the magnet 85 employed for resetting the main circuit breaker 86, the pivoted member or main member of which has an extension 87 adapted to be attracted by the magnet 85 when the latter is energized. A connecting wire 88 is employed to connect the magnet 85 with the main or pivoted member of the circuit breaker 86. Wires 89 of the main circuit are connected with the two parts or the pivoted and the stationary parts of the circuit breaker 86. A spring arm 90 is also employed for engagement with the depending portion 87 of the circuit breaker when the latter is open and the spring arm 90 is connected with the branch 68 of the Y-wire by a connecting branch wire 91. The notched arm 92 of the pivoted member of the circuit breaker rests upon the upper end of the armature 93 when the circuit breaker is closed and said armature 93 is drawn from beneath the notched end 92 when the magnet 29 is energized, thereby releasing the pivoted member of the circuit breaker and causing the opening of the same. The armature 93 is held in its normal position by a spring 94.

The cord 95 of the conductor's emergency valve is extended around a suitable guide roller 96 and then fastened to the pivoted bar 97 which has a catch 98 formed at its opposite end for engagement with the arm 99 projecting radially from the pinion 100, which is loosely mounted upon the shaft 101. A spring 102 is provided for rotating the pinion 100 and arm 99 upon the shaft 101 when said arm 99 is released from the catch 98 thereby throwing on the brakes and moving the arm 99 into engagement with the stop 103.

A branch 104 of the Y-wire, leads from one of the contact points 66 of the controller to the magnet 105 opposite one portion of the pivoted bar 97 and a wire 106 connects the magnet 105 with the pivot member 107 of said pivoted bar 97. A branch 108 of the X-wire leads from the shaft 101 to the main branch of the X-wire thereby making it possible to complete a circuit through the magnet 105 when the catch 98 is engaged with the arm 99 by placing the controller handle on either of the contact points 66. A branch 109 of the X-wire connects the stop member 103 with the branch 27 of said X-wire, thereby throwing the main circuit breaker as the brakes are applied. The purpose of the connections just described will presently appear.

The controller handle works in the bifurcated arcuate resetting member 111, which has teeth 112 on the concave face of its lower portion and engaged with the peripheral teeth of the wheel 113 mounted on the controller shaft 47. As this shaft 47 rotates in a clockwise direction to advance the points of the controller, as the controller handle 62 is moved toward the highest or last point, the member 111 is moved in its arc by the wheel 113. When the controller handle 62 is returned, however, toward the first or primary point of the controller, the handle 62 engages the connecting or bight portion 114 of the member 111 and moves the latter with the handle, thereby rotating the wheel 113 in counter clockwise direction, returning the shaft 47 and all of the parts mounted upon the same to normal position. It will be understood that the member 111 works in a suitable guide groove in a supporting plate forming a part of the controller.

From the foregoing description, taken in connection with the accompanying drawings, it is believed that the operation will be readily understood. It may be briefly stated, however, as follows:—

The current passes from the main line circuit through the rheostat 3 and then by way of the main branch of the wire, to the needle 5 of the ammeter 6. Under normal conditions, that is to say, if the current is not too strong, the needle 5 will be engaged with the contact pin 23 of the member 8 and on to the contact plate 12, then to the wire 28. From this wire 28, the current will pass to the guide 30. The current passes to the electro-magnet 39 by way of X-wire branch 38 and from the electro-magnet 39 to the bracket 40, by way of the wire 41 and then to the shaft 47, by way of the pawl 43, provided the latter is not engaged with an insulated portion of the wheel 46. Passing through the shaft 47, the current leaves the disk 53 through one of the contact points 54 and wires 58 to be conducted to the point 59. The portion 61 of the controller handle 62 conducts the current across the gap between the point 59 and the contact bar 63 and the branch wire 64 conducts the current through the Y-wire, which leads to the ground, thus completing the circuit. As the electro-magnet 39 is energized, and the bar 42 is drawn toward the same, thereby withdrawing the point of the pawl 43 from engagement with the wheel 46, the shaft 47 rotates one notch of the wheel 46. Then as the spring 44 and the teeth 49 of the wheel 48 return the pawl 43 to its normal position, the point of the pawl 43 catches in the next tooth of the wheel 46. With the advance of each notch of wheel 46, the insulated portion 55 of disk 53 cuts out one of the contact points 54. Wheel 46 will not notch up farther than the controller handle 62 is set. If controller is left on contact point 5 of series 59, wheel 46 will stop at notch 5. Controller handle should be notched up the first three notches slowly to keep from starting the car with a jerk; then it can be thrown to the last notch without damage to motors as the automatic feed will stop when current is too strong. It is believed that the operation of this portion of the device will be clear without any further description.

The main circuit closer is not broken or opened under normal conditions. Should there be an excessive amount of current passing through the ammeter, the needle 5 will be moved away from the contact pin 23. This will stop the automatic turning of shaft 47. If the system should have a short circuit, needle 5 will engage with the contact 26 of member 9. This will change the course of the current as it leaves the ammeter and cause the current to travel from the contact plate 11 to the branch wire 27 and through the magnet 29 and back to the Y wire, energizing the magnet 29 and thereby releasing the pivoted member of the main circuit breaker 86 and causing opening of the latter, thereby breaking the controller circuit through the controller.

Should the conductor's emergency valve cord 95 be pulled to operate the conductor's emergency valve, the arm 99 from the wheel 100 would be released, thereby permitting rotation of the shaft 101. This will move the arm 99 into engagement with the stop 103 permitting the current from the wire 108 to pass to the wire 109 and then through the magnet 29 to cause opening of the main circuit breaker.

It will be understood that after operation of the conductor's emergency valve, the shaft 101 may be returned to its normal position to again engage the arm 99 with the catch 98, by hand or any suitable and well known means.

While rotation of the shaft 69 upon release of the arm 73 will cause closing of the air brake cylinder drain cock, as previously described, closing of the door will cause the rack bar 72 to return the shaft 69 and drain cock to open position and engage the arm 73 with the catch 74. The current will also pass over the wire 91, the spring 90, the wire 88, through the magnet 85 over the wire 80 to energize the magnet 85 and thereby return the main circuit breaker to normal or closed position if it be thrown. It will be understood that the members 8 and 9 may be readily adjusted to any desired positions between the plates 11 and 12 of the ammeter.

It will also be apparent that this system is automatic in its operation and will not only advance the shaft 47 automatically as the controller handle is moved from the first or the starting point of the controller, but will also cause automatic opening of the main circuit when the current is too strong or when the controller handle is moved to its limit in either direction or the conductor's emergency brake operated.

This automatic feed is especially adapted for the "K" type of controllers, but it can be used on all kinds with a few alterations. The shaft 47 is an extension of the main controller shaft of whatever type is used. Cylinder 35 may be cut out and wire 28 lead directly to magnet 39; then the brakes will have nothing to do with the automatic feed.

It will be understood that while I have shown a specific arrangement and connection of parts for this system, I do not desire to be limited to the exact arrangement disclosed in this application, as many minor changes may be made in the system without departing from the spirit of the invention or the scope of the appended claims.

I claim:

1. An automatic current control and brake valve operating mechanism for an electric street car, comprising an ammeter, automatic actuating means for a controller, said means being controlled by a current passing through said ammeter, a circuit breaker in electrical connection with said ammeter, an emergency valve, electrical connections between said emergency valve and said circuit breaker to cause operation of the latter upon operation of said emergency valve.

2. An automatic current control and brake valve operating mechanism for an electric street car having an automatic means for the car controller, an ammeter in the path of main current through the controller, a circuit breaker in electrical connection with said actuator and said ammeter, an air brake cylinder, a guide cylinder having communication with said air brake cylinder, a piston within said guide cylinder, electrical connections leading from the actuator means for the controller to said guide cylinder, electrical connections leading from said ammeter to said piston, said piston and guide cylinder being normally insulated from one another, means for draining said air brake cylinder by closing the car door, and means for returning the draining means to normal position upon throwing controller handle to off position.

3. An automatic current control and brake valve operating mechanism for an electric street car comprising an ammeter arranged to receive the current from main line, an air brake cylinder, current actuator means for the street car controller, a circuit breaker, electrical connections between said ammeter and said controller actuator means, means controlled by the pressure in the air brake cylinder to complete a circuit between said ammeter and said actuator means, electrical connections between said controller actuator and the main line circuit, said circuit breaker being connected with a controller circuit leading to said actuator, and means connected with said circuit breaker to cause a resetting of the latter.

4. An automatic current control and brake valve mechanism for an electric street car, the said street car having a controller, the street car also having air brakes and an air brake cylinder, an ammeter connected with the main circuit, current actuated means for automatically actuating said controller governed by the current passing through the ammeter, means adapted to be operated by closing of the car door to release the brakes and permit emptying of the air brake cylinder, a circuit breaker connected with said ammeter and with the actuator for the controller to automatically break the circuit upon an abnormal increase in the current passing through said ammeter, and means for resetting said circuit breaker automatically and electrically.

5. An automatic current control and brake valve mechanism comprising, in combination with an electric railway car having a controller and air brakes, and air brake cylinders; an ammeter electrically connected in the circuit of the main line, a controller including a series of contacts electrically connected with the air brakes and with the air brake cylinder, a controller circuit for said controller, a circuit breaker for the said controller circuit, the latter leading to the said ammeter, means within the said controller circuit to admit the current to the various contact points of the said controller, means within the said controller circuit to effect an opening of the said circuit breaker upon an increase in the strength of the current passing through the said ammeter, the said controller including a handle engageable with the contact points of the controller, means for causing an application of the air brakes when the said controller handle is engaged with certain of the said contact points of the controller, and means for automatically releasing the brakes upon movement of the door of the car.

In testimony whereof I affix my signature in presence of two witnesses.

WILLIAM GARDINER.

Witnesses:
  W. H. CHADWICK,
  T. SCHOENBACHER.